(12) United States Patent
Wisman

(10) Patent No.: US 9,172,793 B2
(45) Date of Patent: Oct. 27, 2015

(54) METHOD AND APPARATUS FOR CORRELATING A PHONE CALL WITH A DISPLAY

(71) Applicant: LikeBillions, Herzliya (IL)

(72) Inventor: Oren Wisman, Herzliya (IL)

(73) Assignee: LikeBillions Ltd. (IL)

( * ) Notice: Subject to any disclaimer, the term of this patent is extended or adjusted under 35 U.S.C. 154(b) by 0 days.

(21) Appl. No.: 14/016,357

(22) Filed: Sep. 3, 2013

(65) Prior Publication Data

US 2014/0093054 A1    Apr. 3, 2014

Related U.S. Application Data

(63) Continuation of application No. 13/454,101, filed on Apr. 24, 2012.

(51) Int. Cl.
| | |
|---|---|
| *H04M 11/00* | (2006.01) |
| *H04M 3/22* | (2006.01) |
| *H04M 7/00* | (2006.01) |
| *H04M 3/42* | (2006.01) |
| *H04M 3/487* | (2006.01) |
| *H04M 3/51* | (2006.01) |

(52) U.S. Cl.
CPC ........ *H04M 3/2218* (2013.01); *H04M 3/42323* (2013.01); *H04M 3/4878* (2013.01); *H04M 7/0033* (2013.01); *H04M 3/5191* (2013.01); *H04M 7/003* (2013.01)

(58) Field of Classification Search
USPC ............ 379/112, 112.01, 257, 265.03, 88.12, 379/100.06, 32.05, 106.08, 164, 25, 142.1, 379/207.12
See application file for complete search history.

(56) References Cited

U.S. PATENT DOCUMENTS

| | | | |
|---|---|---|---|
| 7,120,235 B2 | 10/2006 | Altberg et al. | |
| 7,411,939 B1 * | 8/2008 | Lamb et al. .................. | 370/352 |
| 2006/0265259 A1 | 11/2006 | Diana et al. | |
| 2006/0277108 A1 | 12/2006 | Altberg et al. | |
| 2007/0061475 A1 | 3/2007 | Moissinac et al. | |
| 2007/0100956 A1 * | 5/2007 | Kumar ......................... | 709/217 |
| 2007/0271110 A1 | 11/2007 | Van Der Linden et al. | |
| 2008/0065501 A1 | 3/2008 | Stuart et al. | |
| 2008/0267377 A1 * | 10/2008 | Siegrist ..................... | 379/201.02 |
| 2010/0223183 A1 * | 9/2010 | Smith ............................. | 705/44 |
| 2012/0158528 A1 | 6/2012 | Hsu et al. | |
| 2012/0179524 A1 | 7/2012 | Altberg et al. | |

\* cited by examiner

*Primary Examiner* — Yosef K Laekemariam
(74) *Attorney, Agent, or Firm* — Intrinsic Law Corp.; Ibrahim M. Hallaj

(57) ABSTRACT

A computerized method for correlating a phone call with a telephone-number, comprising receiving at a service facility, comprising an at least one processor, a query from a computer about a status of a phone call with a telephone-number, and sending to the computer a response with information related to the status, and an apparatus for performing the same.

16 Claims, 5 Drawing Sheets

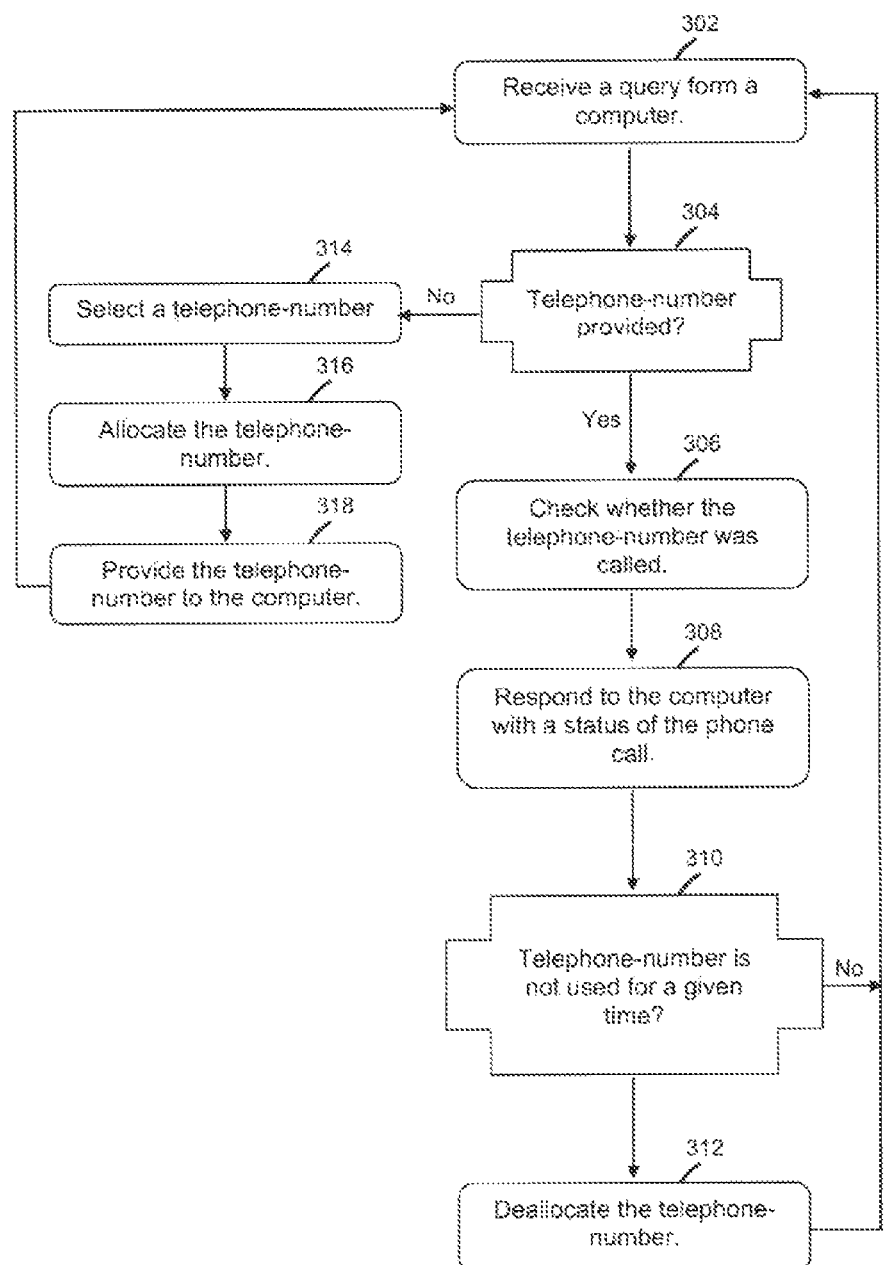

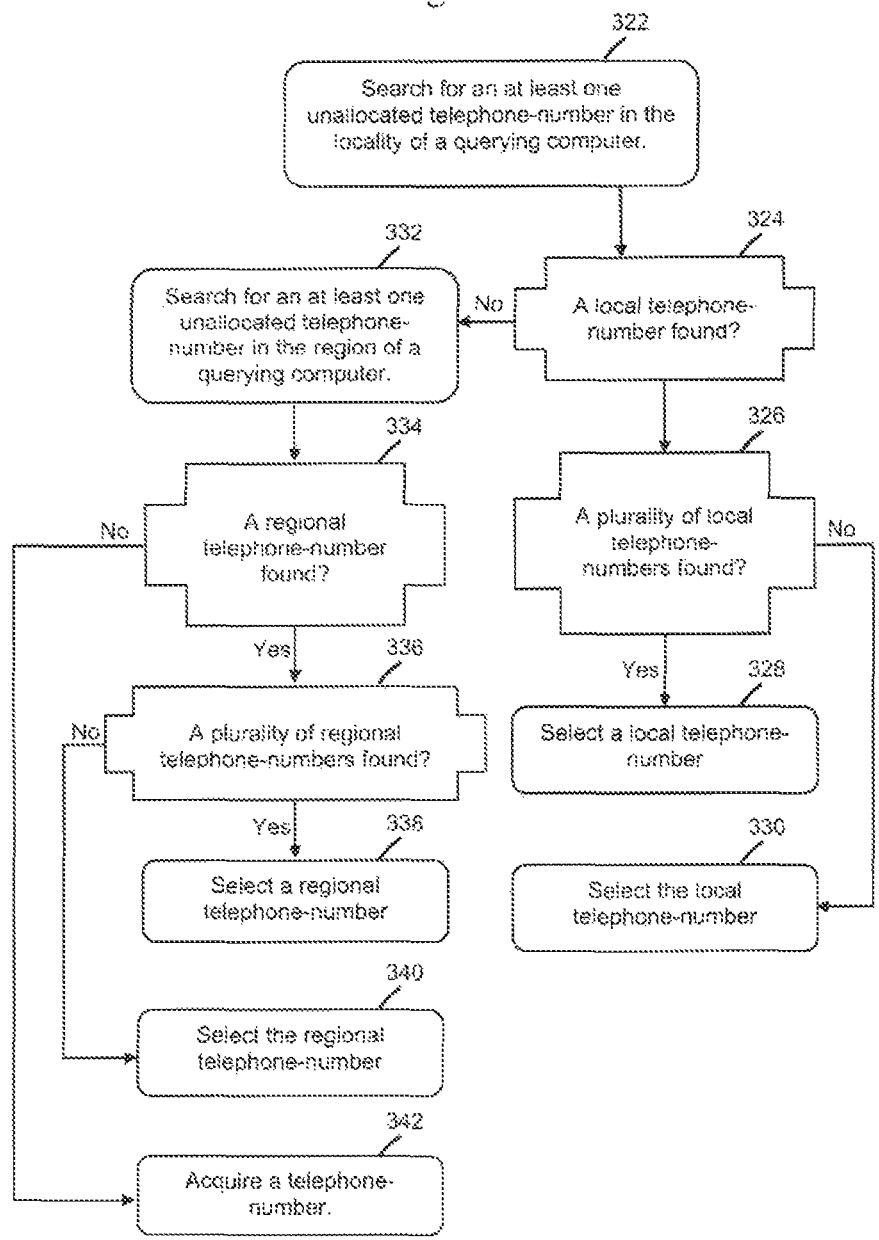

METHOD AND APPARATUS FOR
CORRELATING A PHONE CALL WITH A
DISPLAY

RELATED APPLICATIONS

The present application derives from, claims priority to, and is a continuation of U.S. patent application Ser. No. 13/454,101, filed on Apr. 24, 2012, bearing the present title.

TECHNICAL FIELD

The present disclosure generally relates to tracking of a telephone call, and more specifically to correlating a phone call with a display of a telephone-number.

BACKGROUND

Tracking of phone call according to a displayed telephone-number is known in the art. Some exemplary publications are U.S. Pat. Nos. 7,120,235, 7,505,920, 7,555,106 or International application WO2005/086980.

Some web sites also relate to tracking a phone call, for example, http://paypercall.attinteractive.com/default.aspx, http://avidtrak.com/avidtrak, http://thenextweb.com/2010101/05/google-launching-pay-per-call-mobile-ads.

SUMMARY

One exemplary embodiment of the disclosed subject matter is an apparatus for tracking a telephone call comprising a service facility comprising an at least one processor, the service facility is connectable to and interactable with an at least one computer, and configured to provide the at least one computer information related to a status a phone call with a telephone-number delivered to the at least one computer by way of a program provided by the service facility.

Another exemplary embodiment of the disclosed subject matter is an apparatus for tracking a telephone call, comprising a service facility comprising an at least one processor, the service facility is connectable to and interactable with an at least one computer, and a branch exchange that is connectable to the service facility.

For clarity and brevity, in the context of some embodiments of the present disclosure, without limiting, an advertiser implies an organization, such as a business, having a telephone for receiving calls and advertisement of and/or on behalf thereof.

In the context of some embodiments of the present disclosure, without limiting, a web-page or web-site implies one or more documents residing on a server, wherein the web-page or web-site contents is at least partially accessible for viewing and may comprise data such as an executable code. The server storing or hosting the advertiser's web-page is also referred to as a host.

An advertiser's web-site or an advertiser's host refers, respectively, to web-site or host of or on behalf of an advertiser.

In the context of some embodiments of the present disclosure, without limiting, a client computer implies a computer linked to the host and operated by a user executing a browser, wherein the browser implies, without limiting, a program operative to communicate with the host and present contents of the advertiser's web-page.

In the context of some embodiments of the present disclosure, without limiting, a branch exchange implies an apparatus for receiving telephone calls and routing the calls to telephones, such as a Private Branch Exchange (PBX), where the branch exchange is connectable to another device and interrogable about received and, at least optionally, routed phone calls.

In the context of the present disclosure, without limiting, a service facility implies one or more computers configured at least for tracking telephone calls via a telephone branch exchange and for interacting with client computers, generally the client computers are remote to the service facility and connected to the service facility by communication link.

In the context of the present disclosure, without limiting, the term 'query' is used to denote any message sent from a first device to a second device, and the term 'response' denotes any message sent back from the second device to the first device.

BRIEF DESCRIPTION OF THE DRAWINGS

Some non-limiting exemplary embodiments or features of the disclosed subject matter are illustrated in the following drawings:

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
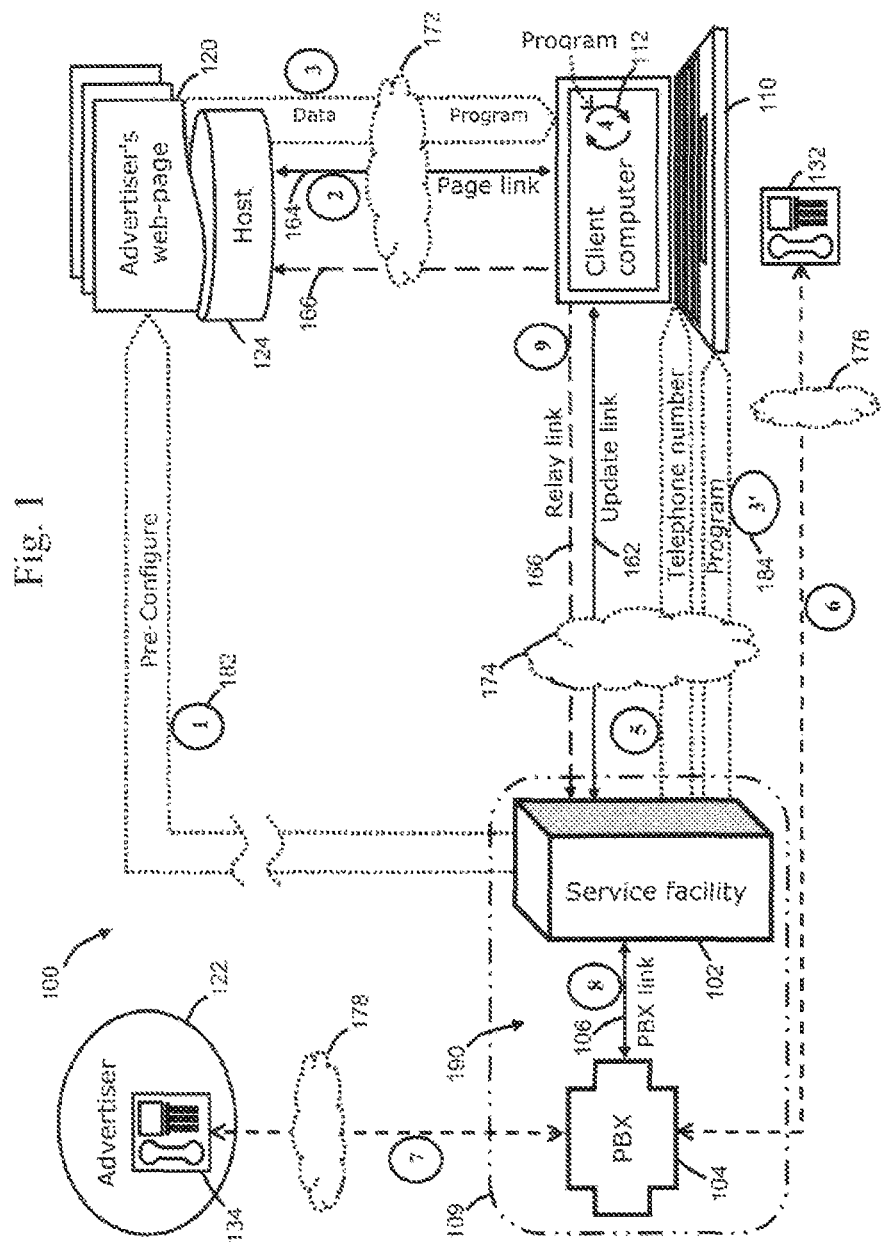

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2A:
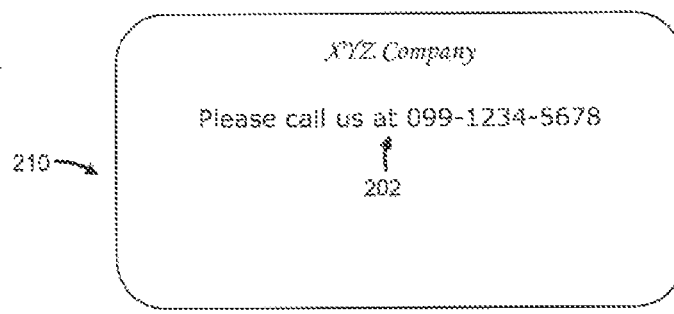
Figure 2B:
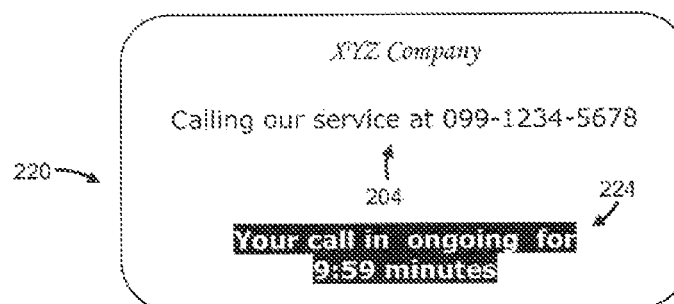
Figure 2C:
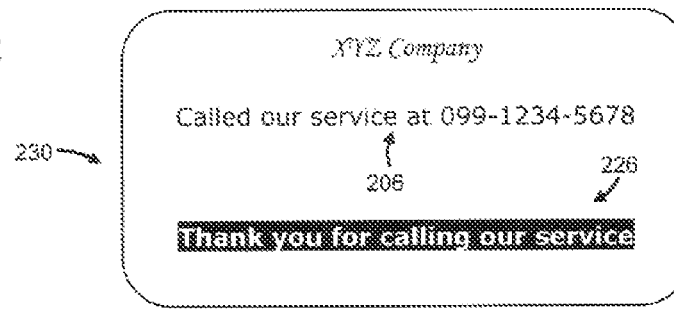
Figure 2D:
Figure 4:
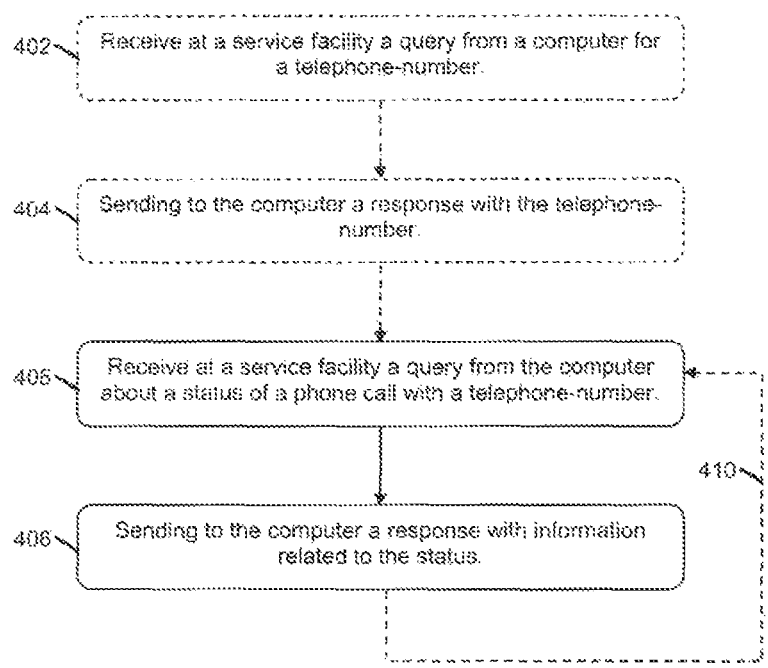

FIG. 1 diagrammatically illustrates an overall view of a scheme for correlating a phone call with a displayed telephone-number, according to exemplary embodiments of the disclosed subject matter;

FIGS. 2A-2B schematically illustrate feasible displays, prompting a phone call and related feedback, according to exemplary embodiments of the disclosed subject matter;

FIGS. 2C-2D schematically illustrate feasible displays, prompting a phone call and related feedback, according to exemplary embodiments of the disclosed subject matter;

FIG. 3A outlines operations by the service facility, according to exemplary embodiments of the disclosed subject matter;

FIG. 3B outlines operations by the service facility for selecting a telephone-number, according to exemplary embodiments of the disclosed subject matter; and FIG. 4 schematically illustrates operations for correlating a phone call with a telephone-number, according to exemplary embodiments of the disclosed subject matter.

DETAILED DESCRIPTION

One technical problem dealt by the disclosed subject matter is interacting with a web-site responsive to a telephone call suggested or prompted by the web-site.

One technical solution according to the disclosed subject matter comprises a service facility linked to a telephone branch exchange, and a server operating on behalf of an advertiser and hosting an advertiser's web-page accessible by a client computer. The advertiser's web-page is configured by the service facility to provide data that include contact data for reaching the service facility.

Responsive to accessing the advertiser's web-page by a user operating the client computer, the client computer obtains from the advertiser's web-page the contact data to reach the service facility. By using the contact data, a communication link is established between the service facility and the client computer, and indirectly with the advertiser's web-page via the client computer operative as a relay.

The communication link between the service facility and the client computer are also referred to as update-link or feedback-link. The indirect communication link between the service facility and the advertiser's web-page are also referred to virtual link or relay link.

In some embodiments, responsive to accessing the advertiser's web-page by the client computer, the advertiser's web-page responds by providing a program executable on the client computer and communicable with the service facility. Alternatively, using the update-link with the service facility, the client computer obtains the program from the service facility.

Using the program, the client computer sends via the update-link a request to the service facility for a telephone number. The service facility responds by sending a unique telephone number pertaining to the advertiser's web-page as displayed on the client computer.

It is noted that in case a plurality of client computers concurrently access the advertiser's web-page and display contents thereof, each client computer would receive a telephone-number different from the others.

In some embodiments, using the program the client computer inserts or updates the telephone number in the displayed contents of the browser, such as amending data contents related to display that were downloaded from the advertiser's web-page. Alternatively, the client computer sends the number to the advertiser's web-page that updates the number in the contents of the web-page, consequently updating the number presented in the browser of the client computer.

Once the user calls the presented number, such as by a telephone by the user's location, the call reaches the telephone branch exchange which directs the call to a telephone at the location of the advertiser. The service facility is informed, by cooperating with the telephone branch exchange, that the number was called. The service facility further obtains or incorporates information pertaining to the advertiser and/or the advertiser's web-page and/or the client computer. For example, using the address of the client computer the service facility is informed about the locality from which the phone was called subsequently to presenting the telephone number on the client computer.

Using the program the client computer further periodically queries the service facility whether the call is active. Responsively, the service facility interacts with the client computer and/or with the advertiser's host via the client computer. For example, sending or invoking a message on the client computer to the effect that the telephone call was indeed carried out or about the duration thereof.

In some embodiments, an advertiser's web-page is identified by one or more keywords, such as by a search engine.

Using the aforementioned apparatus, once a user accesses the advertiser's web-page, the client computer, by way of the program or interaction with the web-page, obtains the keywords and forwards them to the service facility via the client computer using the virtual link and/or the update link.

Thus, the information of the service facility relating to the advertiser and/or the advertiser's web-page and/or the client computer is enriched with the relevant keywords that were used to identify the advertiser's web-page.

Furthermore, the information may be provided to one or more services and/or computers such as an analytics service, for example, Google Analytics (©Google Inc.).

According to the description above, the apparatus enables to correlate two independent and unrelated operations—viewing a web-site and a conducting a phone call—into a coherent interactive process.

A potential technical effect of the disclosed subject matter is displaying a phone number on a computer and interacting with the computer with respect to an independent phone call with or by the phone number.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 diagrammatically illustrates an overall view of a scheme 100 for correlating a phone call with a displayed telephone-number, according to exemplary embodiments of the disclosed subject matter.

Scheme 100 comprises an apparatus 190, framed in a frame 109, provided by a vendor for carrying out a correlation between a phone call and a displayed telephone-number. For brevity, the correlation between a phone call and a displayed telephone-number is also referred to, without limiting, as the 'correlation'.

Apart of apparatus 190, the other units and/or entities and/or elements of scheme 100 are existing and/or potential units with which apparatus 190, and/or an entity on behalf of apparatus 190, interacts directly and/or indirectly. For brevity and without limiting, the other units and/or entities and/or elements of scheme 100 are also referred to collectively as the 'environment'.

Each of a cloud shape 172 and a cloud shape 174 represents a communication link such as a network link or a link via the internet. For brevity and without limiting, the communication link is referred to as a web-link. Each of a cloud shape 176 and a cloud shape 178 represents a telephone network or interconnection.

For convenience, operations involved in the correlation are indicated by circles with numbers depicting an exemplary order of the correlation, denoted herein as (n) where 'n' stands for an ordinal number. For example, circle 182 indicating an exemplary initial operation (1), or circle 184 (3') indicating an alternative operation to at least a part of operation (3).

Apparatus 190 comprises a service facility 102, comprising one or more processors, service facility 102 connectable to and interactable with an at least one computer, denoted a client computer 110. The computer is generally remote from service facility 102, and is denoted also a remote computer.

Apparatus 190 further comprises a telephone branch exchange, such as private branch exchange (PBX), denoted as branch exchange 104. Branch exchange 104 maintains a plurality of telephone-numbers and/or branch exchange 104 is connectable to one or more branch exchanges at various locations and/or branch exchange 104 is connectable to one or more public telephone service.

A telephone-number that can reach branch exchange 104 is referred to, without limiting, as a telephone-number of branch exchange 104, and also as telephone-number unless otherwise specified or clearly evident by a context.

Branch exchange 104 is linked to or coupled with service facility 102 by a communicating link, denoted as a PBX link 106. Service facility 102 can interrogate, or poll, branch exchange 104 about a phone call by a telephone-number of branch exchange 104. For example, whether a call is conducted, and/or about the length of the call and/or any data or parameters of the call. Optionally or alternatively, branch exchange 104 can notify or signal to service facility 102 about a phone call by a telephone-number of branch exchange 104.

The environment comprises an organization, referred herein also as an advertiser, such as an advertiser 122. The advertiser or an organization operating on behalf thereof, such as a call center, has a telephone, denoted as an advertiser-telephone 134, that can be reached by branch exchange 104.

The environment comprises a web-page of the advertiser and/or on behalf of the advertiser, denoted as an advertiser's web-page 120, residing on a host computer, denoted as host 124.

As discussed below, service facility 102 communicates with client computer 110 by a communication link, denoted as an update link 162. Client computer 110 communicates with advertiser's web-page 120 and/or host 124 by communication link, denoted as a page link 164. Service facility 102 communicates indirectly, via client computer 110 as a relay, with advertiser's web-page 120 and/or host 124 by communication link, denoted as a relay link 166. The communications is performed according to mutual protocols such as HTTP or FTP.

Service facility 102 or an agent or other entity operating on behalf thereof configures advertiser's web-page 120 (1). Advertiser's web-page 120 is configured with data and/or software operative responsive to accessing advertiser's web-page 120 by a web-link, thereby sending data and/or a program responsive to the access. Advertiser's web-page 120 is configured such as by sending or otherwise providing the data and/or software to the advertiser or an entity or agent operative on behalf thereof. Consequently, the advertiser or an entity or agent operative on behalf of the advertiser installs the data and/or software in the advertiser's web-page 120 and/or host 124.

The data and/or software comprise data that include contact data for reaching service facility 102 and, optionally, a program operable on client computer 110.

Subsequently at a later time the following scenario potentially and/or actually is conducted.

Operated by a user, client computer 110 accesses advertiser's web-page 120 via page link 164 by using an appropriate application such as a web browser, collectively denoted, without limiting, as a browser. For example, the user provides a search engine with keywords and activates the search engine via client computer 110, thereby presenting advertiser's web-page 120 on the browser in case advertiser's web-page 120 was identified by the search engine.

Responsive to accessing (2) advertiser's web-page 120, host 124 sends contents of advertiser's web-page 120 to client computer 110, and further sends (3) data that include the contact data for reaching service facility 102 and, optionally, a program that executes on client computer 110, such as in conjunction with or within the framework of a browser operating thereon (4). The executing program is indicated schematically as a program 112.

In some embodiments, the program is a script such as JavaScript (ORACLE AMERICA, INC.) or the program is operative by other techniques or frameworks or plug-in technologies such a Flash (Copyright © 2012 Adobe Systems Incorporated) or ActiveX (Microsoft Corporation).

Having received contact data for reaching service facility 102, client computer 110 accesses service facility 102 via update link 162, thereby indicating that a telephone-number is required. Furthermore, at least optionally, client computer 110 provides to service facility 102 information about the locality of client computer 110. The locality of client computer 110 may be determined, for example, by the IP address thereof, or by other means such as GPS, or spotting by a cellular provider, or by manual entry by a user of client computer 110. Optionally or alternatively, the locality of client computer 110 may be reported to service facility 102 within a query from client computer 110. Optionally or alternatively, service facility 102 determines the locality of client computer 110, such as by the IP thereof as revealed in a communication protocol such as TCP/IP.

In response, service facility 102 sends (5) to client computer 110 a telephone-number reachable to and/or maintained by branch exchange 104.

The telephone-number is determined and/or selected such as to be distinctive and unique to the display of advertiser's web-page 120 on client computer 110, and further with respect to other displays of advertiser's web-page 120 on other computers potentially connected or actually connected to service facility 102.

In some embodiments, the determination of the telephone-number is, for example, by the availability of telephone-numbers, the locality of client computer 110, or by other criteria such as cost or a medium by which the call is transferred.

The telephone-number of branch exchange 104 is reserved or allocated as unique or distinct to advertiser's web-page 120 as displayed on client computer 110 at least for a certain time interval. For example, until a phone call by the telephone-number is made and finished, or until a pre-set or a determined time interval has elapsed in which no call by the telephone-number is made.

The telephone-number is optionally incorporated in data of client computer 110, such as in the source data of advertiser's web-page 120 sent to client computer 110. Alternatively, client computer 110 sends via relay link 166 the telephone-number to advertiser's web-page 120 which incorporates the telephone-number therein, such as by a program configured therein, and consequently sends the updated page or a part thereof to client computer 110. Either way, the telephone-number is displayed on client computer 110 by the browser.

In an alternate embodiment, instead of host 124 sending (3) the program to client computer 110, service facility 102 sends the program responsive to accessing service facility 102 by client computer 110 (3').

By or at the vicinity of client computer 110 the user has an access to a telephone, denoted as user-telephone 132.

Prompted by the displayed telephone-number, the user dials or otherwise activates user-telephone 132 (6), thereby the call reaches branch exchange 104. Responsively, branch exchange 104 directs or routes (7) the call to advertiser-telephone 134.

Meanwhile, client computer 110 queries service facility 102, via update link 162, about the status of a phone call by the telephone-number. Responsively, service facility 102 interrogates branch exchange 104 via PBX link 106 whether a call has reached branch exchange 104 and/or the time and/or duration of the call and/or other information such as the number of advertiser-telephone to which the call was routed. Consequently, service facility 102 responds via update link 162 and provides client computer 110 with information of and/or related to the status of the call (9). For example, using the program operating in and/or on client computer 110, information of the call is displayed by the browser, such as call duration or destination number of advertiser-telephone. Optionally or additionally, the program, according to the status, invokes a notification message such as acknowledgement of receiving the call and/or in case no call was made a message prompting the user to call.

Optionally, client computer 110 queries service facility 102 repeatedly, such as periodically, thereby service facility 102 repeatedly updates client computer 110 on the status of the call or otherwise to that effect. For example, client computer 110 queries service facility 102 every about 5 seconds or every other interval, the interval predetermined or dynamically determined such as according to the phone call status reported to client computer 110.

Generally, without limiting, client computer 110 and service facility 102 use codes or other constructs to indicate what is requested and what is responded, wherein the program in client computer 110 is operative to handle the information exchange and resultant operations.

In some embodiments, in responding to queries from client computer 110, service facility 102 sends updates to the program in client computer 110 and affects, such as by a code, updating or modifying the program in client computer 110 and/or data used by the program such as operational parameters.

In some embodiments, such as after a phone call with the telephone-number was made and/or after a certain time interval after a call is made, in responding to queries from client computer 110, service facility 102 affects, such as by a code, disabling and/or deactivating of the program in client computer 110.

It is noted that displaying on client computer 110 advertiser's web-page 120 with the telephone-number is, essentially, and independent operation not related whatsoever to a user making a phone call, and making a phone call is, essentially, not related whatsoever to displaying advertiser's web-page 120.

Nevertheless, by using apparatus 190 operating as described in the scenario above, displaying advertiser's web-page 120 with the telephone-number on one hand, and a phone call, or lack thereof, with the telephone-number on the other hand, are automatically correlated, providing feedback about the call to client computer 110 and, correspondingly, to the user operating and/or viewing client computer 110.

FIGS. 2A-2D schematically illustrate feasible displays, prompting a phone call and related feedback, according to exemplary embodiments of the disclosed subject matter.

FIG. 2A illustrates a screen 210 of a browser at client computer 110 prompting to call a telephone-number as indicated by a message 202.

FIG. 2B illustrates a screen 220 of a browser at client computer 110 when a call is conducted with the prompted telephone-number, the prompt changed from screen 210 as indicated by a message 204 and further providing the user by a message 224 a feedback that the call is active and for the duration thereof.

FIG. 2C illustrates a screen 230 of a browser at client computer 110 when a call with the prompted telephone-number was conducted and ended, the prompt changed from screen 220 as indicated by a message 206 and further providing the user by a message 226 a feedback that the call was conducted and ended, optionally if the call was conducted for a determined or pre-determined time interval.

FIG. 2D illustrates a screen 240 of a browser at client computer 110 when a call with the prompted telephone-number was not conducted, the prompt changed from screen 210 as indicated by a message 208 and further providing the user by a message 228 a feedback that the call was not conducted, optionally after displaying of screen 210 for a determined or pre-determined time interval.

In some embodiments, screen 240 is presented in case the phone call was tried but did not last for a determined or pre-determined time interval.

In some embodiments, or cases, a phone call may fail such as disconnected and/or reaching a busy end or a non-existent telephone, optionally after a plurality of trials and/or after a determined or pre-determined time interval. In some embodiments, in case the phone call was tried and failed the screen may change with a message and/or display to this effect and, optionally, a different number is presented and prompted. Optionally, the different number is a direct number of advertiser-telephone 134 and/or an alternative thereof, such as another telephone-number of an extension or another extension or a telephone-number of an affiliate of the advertiser. In some embodiments, the direct number of advertiser-telephone 134 is always displayed on client computer 110 in addition to the telephone-number provided by service facility 102.

The time intervals with respect to FIGS. 2A-2D above are either pre-set such as according to expected behavior of callers. Optionally or additionally, the time interval are determined dynamically according to behavior history or statistic and/or based on the activity of callers. For example, if a call is started but the destination is busy or the call is terminated abruptly, a larger time interval is allowed.

In some embodiments, using update link 162 and/or relay link 166, service facility 102 obtains or fetches information from advertiser's web-page 120 and/or provides or supplies information to advertiser's web-page 120.

As one example, in a response to a query from client computer 110, service facility 102 responds with data indicating to client computer 110 to access advertiser's web-page 120 for information, and subsequently sending the information to service facility 102 within a query thereto. As another example, in a response to a query from client computer 110, service facility 102 responds with information and data indicating client computer 110 to access advertiser's web-page 120 and query the latter and provide the information thereto.

In some embodiments and/or cases, advertiser's web-page 120 identified by a search engine is provided by the search engine with the keywords used to identify advertiser's web-page 120. Accordingly, in some embodiments, by way of relay link 166 service facility 102 fetches the keywords from advertiser's web-page 120. It is noted that referring to keywords implies also one keyword and any combination of keywords.

In some embodiments, service facility 102 supplies advertiser's web-page 120 with information such as pertaining to the phone call. Optionally, by using software configured in advertiser's web-page 120, advertiser's web-page 120 may use the data such, for example, collecting and storing history of phone calls.

In some embodiments, service facility 102 collects and data pertaining to the phone call and/or advertiser's web-page 120, and incorporates the data in some structure such as in a database. The data comprises, for example, call start time and end time, telephone-number or user-telephone 132 and keywords used to identify advertiser's web-page 120.

In some embodiments, service facility 102 analyses the data and sends reports to advertiser 122. Optionally or alternatively, service facility 102 provides the data to an analytics service that, consequently, may send reports to advertiser 122.

In some embodiments, at least a part of the program is executed in service facility 102 and/or advertiser's web-page 120 and/or host 124, transferring data via update link 162 and/or page link 164 and/or relay link 166.

In some embodiments, a 'live' recurring takes place between service facility 102 and client computer 110, based on repeated queries by client computer 110 and corresponding responses from service facility 102. The rate of the queries may be pre-set and/or responsive to updates from service facility 102. Exemplary rate is every about 1 second or every about 3 seconds or about 5 seconds or every any other time interval.

Optionally or additionally, in some embodiments, a temporary link may be established between service facility 102 and client computer 110 such that service facility 102 may initiate updates for client computer 110. For example, after an initial query, the program interacts with service facility 102 and sets up a link operating according to a particular protocol or rules that allows service facility 102 to directly interact with the program not necessarily limited to a response to a query.

FIG. 3A outlines some operations by the service facility, such as service facility 102, according to exemplary embodiments of the disclosed subject matter.

Generally, the service facility waits for queries, such as from a computer, the computer generally, without limiting, remote from the service facility.

At operation 302 the service facility receives a query from a computer, such as client computer 110.

In some embodiments, the computer notifies the service facility of the identity thereof. Optionally or alternatively, the service facility determines the identity of the computer such by the IP thereof.

At operation 304 the service facility checks whether a telephone-number was sent to the computer, at least recently such as within a determined or pre-determined time interval.

In case a telephone-number was not sent, at least not recently such as within a determined or pre-determined time interval, in operation 314 the service facility selects a unique or distinctive telephone-number for the computer, as discussed in more details below with respect to FIG. 3B. Optionally or additionally, the service facility provides the computer with other data such as a unique data, akin to a password, for identifying and/or augmenting the identification of the computer in further interactions with the.

At operation 316 the service facility allocates the telephone-number for the computer, at least for a determined or pre-determined time interval. Consequently, in operation 318, the service facility provides the computer with the telephone-number such as in a response to the query. Subsequently the service facility waits for further queries from the computer.

In case a query from the computer is received after a telephone-number was sent to the computer, at least recently such as within a determined or pre-determined time interval, in operation 306 the service facility determines the status of the phone call with the telephone-number. For example, whether a phone call by the telephone-number was made. In some embodiments, the service facility determines the status of the phone call by interrogating a branch exchange to which the phone call is configured to reach. The status of the phone call may comprise an indication that no call was made so far, or that the call is made, where the status may comprise the time of an ongoing call.

In operation 308 the service facility responds to the query back to the computer with the status of the phone call.

In operation 310 the service facility determines if the phone call is not active for a pre-determined or determined time interval, such as that no phone call was made with the telephone-number or the phone call was terminated.

If the phone call is still active, the service facility waits for further queries from the computer. Otherwise, in operation 312 the service facility deallocates the telephone-number, freeing the telephone-number to be optionally and/or potentially used by other computers or for other uses.

Optionally the service facility overriding the number or deletes the telephone-number from the computer such as by an indication to this effect in a response to a query from the computer. For example, upon receiving the indication the computer, such as by a program executing therein, deletes or overrides the number preciously provided.

Subsequently, the service facility marks that no telephone-number is provided for the computer and the service facility waits anew for queries from a computer.

The time intervals with respect to FIG. 3A above are either pre-set such as according to expected behavior of callers. Optionally or additionally, the time interval are determined dynamically according to behavior history or statistic and/or based on the activity of callers. For example, if a call is was made and is over the time interval is shorter than the time interval for waiting for a call.

It is noted that the service facility may handle and respond to a plurality of calls, operating correspondingly with the querying computers, such as according to the identity of the querying computers and/or the telephone-number provided thereto and/or according to a unique code provided to and/or a computer. In some embodiments, a separate execution thread is assigned for each querying computer and/or other programming methods may be employed event driven operation where a query triggers an event with an indication of the querying computer.

It is noted that the sequence respective to FIG. 3A is an exemplary one and may be modified, for example, selection and allocation of a telephone-number may be combined into one operation.

FIG. 3B outlines operations by the service facility for selecting a telephone-number, according to exemplary embodiments of the disclosed subject matter.

In operation 322 an at least one unallocated or unused telephone-number in the locality of a querying computer is searched for.

In operation 324 it is determined whether a local unallocated telephone-number is found, and in operation 326 it is determine whether pluralities of local unallocated telephone-numbers are found. In case only one local unallocated telephone-number is found, in operation 330 that one local unallocated telephone-number is selected.

In case a pluralities of local unallocated telephone-numbers are found one local unallocated telephone-number is single out in operation 328 according to criteria such as described below.

In case no local unallocated telephone-number is found, in operation 332 an at least one unallocated or unused regional telephone-number in the region of a querying computer is searched for.

In operation 324 it is determined whether a regional unallocated telephone-number is found, and in operation 336 it is determine whether pluralities of regional unallocated telephone-numbers are found. In case only one regional unallocated telephone-number is found, in operation 340 that one regional unallocated telephone-number is selected.

In case a pluralities of regional unallocated telephone-numbers are found one regional unallocated telephone-number is single out in operation 338 according to criteria such as described below.

In case no regional unallocated telephone-number is found, in operation 342 an at least one unallocated or unused telephone-number accessible for a user of the computer is acquired and selected.

When a plurality of telephone-number are available, such as a plurality of local or regional unallocated telephone-numbers, a telephone-number is singled out from the plurality of telephone-number by employing criteria.

Exemplary non-limiting criteria are:

the least used telephone-number over a given or determined time interval;

the least expensive telephone-number; or the most recently used telephone-number in the locality and/or region of the computer.

Other criteria may be used, including a random selection, as well as a combination of criteria.

Referring with respect to FIG. 3A to a local telephone-number implies, without limiting, a telephone-number of a zone in a vicinity of the computer, such as a town or a district, and referring to a regional telephone-number implies, without limiting, a telephone-number of a geographical of the computer, such as a county or a state.

In some embodiments, the method respective to FIG. 3A is simplified wherein a telephone-number is searched in some geographical area with no refinement for local or regional telephone-number. Optionally or alternatively, the method respective to FIG. 3A is expanded with further refinement for zones such as town, district, county, state or any other geographical hierarchy.

With respect to FIG. 3A, referring to acquiring a telephone-number implies leasing or purchasing a telephone-number such as from a Public Switched Telephone Network (PSTN) or a cellular provider.

It is noted that the sequence respective to FIG. 3B is an exemplary one and may be modified, for example, determining whether a local telephone is found and whether a plurality of local telephone are found may be combined into one operation. It is further noted that other methods may be used for selection of telephone-number. For example, the service facility may cooperate with a PSTN and/or VoIP service which provides the service facility with a telephone-number.

The telephone-numbers discussed above with respect to FIGS. 3A-3B are such that eventually, directly and/or indirectly, a call by the telephone-number can be determined and/or identified by the service facility. For example, the call eventually, directly and/or indirectly, reaches a branch exchange that can be queried or interrogated by the service facility about the call such as of a status thereof, and/or the branch exchange can notify the service facility about the call such as by a status thereof.

In some embodiments, branch exchange 104 and service facility 102 are integrated or combined together, such that branch exchange 104 is a part of service facility 102.

In some embodiments, the communications between computers, such as client computer 110, and a web-site or web-page, such as advertiser's web-page 120, is carried out via the internet.

Optionally or additionally, in some embodiments, other communication techniques are used, such as cellular communication, wherein, optionally, the locality of a computer is obtained by a positioning service of a cellular provider.

In some embodiments, a combination of a plurality of communication techniques is used, for example, a cellular communication between the service facility and the computer and internet between the computer and the web-site.

In some embodiments, instead of and/or in addition to using a telephone to reach an advertiser, other methods may be used, such as emails. For example, the service facility provides a computer with a unique email address that is accessible to the service facility, where the computer displays the unique email address akin to displaying a telephone-number, and the service facility and the computer interact according to the email.

In some embodiments, status of a phone call may comprise information obtained from some resources. For example, voice or mood recognition for particular mood or phrases that can be sent to the computer which, accordingly, may modify the display. Optionally or additionally, the status may further comprise information such as the name or ID of the agent answering the call.

In some embodiments, the advertiser or an entity operating on behalf thereof such as a program and/or and agent may modify the advertiser's web-page, where the change may be identified by the program operating on the computer and the display may be modified accordingly. Optionally or additionally, the advertiser or an entity operating on behalf thereof may send data over the telephone where the data the service facility can detect the data and update the computer which may modify the display accordingly. For example, discussing a price of a product or service, a special offer may be sent over the phone and consequently displayed on the computer.

FIG. 4 outlines operations for correlating a phone call with a telephone-number, according to exemplary embodiments of the disclosed subject matter.

In operation 402, essentially an optional operation, a service facility receives a query from a computer for a telephone-number.

In operation 404, correspondingly an optional operation, the service facility sends to the computer a response with the telephone-number.

In operation 406 the service facility receives a query from the computer about a status of a phone call with a telephone-number, the telephone-number optionally obtained in operations 402-404 or similarly or otherwise.

In operation 408 the service facility sends to the computer a response with information related to the status, such as whether the phone call is active and/or the duration of the phone call or any other information respective to the phone call.

Generally, in some embodiments, the service facility is waiting for queries from the computer or other computers and responds correspondingly to the queries.

In some embodiments, the service facility receives repeated queries from the computer, as indicated by an arrow 410, thereby providing the computer with updated information about the status of the phone call.

In some embodiments, the service facility obtains the status of a phone call and/or other data related to the phone call by interacting with a branch exchange to which the call is reached or configured to reach.

There is thus provided according to the present disclosure a computerized method for correlating a phone call with a telephone-number comprising receiving at a service facility, comprising an at least one processor, a query from a computer about a status of a phone call with a telephone-number, and sending to the computer a response with information related to the status.

In some embodiments, the method further comprises providing the computer with the telephone-number responsive to a query for the telephone-number.

In some embodiments, the telephone-number is displayable on the computer within a web-page retrievable from a web-site.

In some embodiments, the telephone-number is distinctive of a display of the web-page retrievable from the web-site.

In some embodiments, the web-site is configured with data comprising information retrievable by the computer for accessing the service facility.

In some embodiments, the telephone-number is directable to a telephone of an organization.

In some embodiments, the computer is configured with a program operable on the computer for communicating with the service facility.

In some embodiments, the program is provided on behalf of the service facility.

In some embodiments, the program is provided by the service facility.

In some embodiments, the query is received repeatedly, responsively repeatedly updating the computer with information related to the status.

In some embodiments, the information related to the status is based on data obtained from a branch exchange that is reachable by the telephone-number.

In some embodiments, the branch exchange is connected to the service facility.

There is thus further provided according to the present disclosure an apparatus for tracking a telephone call comprising a service facility comprising an at least one processor, the service facility is connectable to and interactable with an at least one computer, and configured to provide the at least one computer information related to a status a phone call with a telephone-number delivered to the at least one computer by way of a program provided by the service facility.

In some embodiments, the service facility is configured to provide the at least one computer a program operable on the at least one computer for interacting with the service facility.

In some embodiments, the apparatus further comprising a branch exchange connectable to the service facility, the branch exchange reachable by the phone call and configured to provide the service facility with a status of the phone call.

In some embodiments, the service facility is configured to obtain from the branch exchange a status of a phone call reachable to the branch exchange.

In some embodiments, the service facility is connected to and interacting with the at least one computer by way of the program provided by the service facility The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term "configuring" and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or "adapting" for an objective, or a variation thereof, implies using materials and/or components in a manner designed for and/or implemented and/or operable or operative to achieve the objective.

Unless otherwise specified, the terms "about" with respect to a magnitude or a numerical value implies within an inclusive range of −10% to +10% of the respective magnitude or value.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

What is claimed is:

1. A method for associating a telephone call with a client computer connection, comprising: receiving a request from a client computer containing client identification information, said client identification comprising geographic information about a location of said client computer;
- selecting a client-specific telephone number from at least one unallocated telephone number, said client-specific telephone number being uniquely associated with a client browser session and selected based on said geographic information of said client computer;
- allocating said client-specific telephone number to said client for a time interval;
- pre-configuring a web page of a third party host with instructions that cause said client computer to receive said client-specific telephone number;
- receiving call status information from a telephone exchange regarding a status of said telephone call made to said client-specific telephone number;
- associating said call status information with said client computer connection; and
- providing an update to said client computer based at least on said status of said telephone call.

2. The method of claim 1, said client identification information comprising browser session identification information.

3. The method of claim 1, said client identification information comprising information identifying a user of said client computer.

4. The method of claim 1, said client identification information comprising internet protocol (IP) address information of said client computer.

5. The method of claim 1, providing an update comprising sending updated content to a browser of said client computer.

6. The method of claim 1, providing an update comprising sending data to said client computer to control an action of said client computer.

7. The method of claim 1, said call status information comprising an indication that a call has been made to said client-specific telephone number.

8. The method of claim 1, said call status information comprising an indication that a call has not been made to said client-specific telephone number.

9. The method of claim 1, further comprising providing instructions to said client computer, said instructions causing the client computer to receive updated content in a client browser session corresponding to the status of said call to the client-specific telephone number.

10. The method of claim 1, further comprising determining said client-specific telephone number in a service facility in communication with said client computer, the service facility providing to a host server data including said client-specific telephone number, by way of said client computer.

11. The method of claim 1, further comprising determining said client-specific telephone number in a service facility in communication with said client computer, the service facility providing to said client computer data including said client-specific telephone number, and presenting the client-specific telephone number on a client computer display in the context of said client connection.

12. The method of claim 1, further comprising receiving updates from said client computer so as to maintain a substantially up-to-date connection with said client computer.

13. A computerized service facility comprising: at least one processor adapted for executing program instructions; said service facility including a communication link to a client computer; said service facility further including a communication link to a telephone exchange;
- said processor programmed and adapted to receive from said client computer client identification information comprising geographic information about a location of said client computer and to select a client-specific telephone number from at least one unallocated telephone number, said client-specific telephone number being uniquely associated with a client browser session and selected based on said geographic information of said client computer;
- said processor further programmed and adapted to allocate said client-specific telephone number to said client for a time interval;
- said processor further programmed and adapted to pre-configure a web page of a third party host with instructions that cause said client computer to receive said client-specific telephone number;
- said processor further programmed and adapted to receive from said telephone exchange call status information indicative of a status of a call to said client-specific telephone number; and said service facility providing an output corresponding to said status of said call.

14. The service facility of claim 13, comprising a server computer having at least one computer processor, a storage memory device and at least one communication port capable of communicating using the TCP/IP protocol.

15. The service facility of claim 13, further comprising a communication port coupled to a host computer containing advertising content.

16. The service facility of claim 13, further comprising instructions for determining a time interval at which to update said call status.

* * * * *